United States Patent [19]

Tokumaru

[11] Patent Number: 4,831,571
[45] Date of Patent: May 16, 1989

[54] BARREL SHIFTER FOR ROTATING DATA WITH OR WITHOUT CARRY

[75] Inventor: Takeji Tokumaru, Yokohama, Japan
[73] Assignee: Kabushiki Kaisha Toshiba, Kawasaki, Japan
[21] Appl. No.: 83,628
[22] Filed: Aug. 10, 1987
[30] Foreign Application Priority Data
Aug. 11, 1986 [JP] Japan .................................. 61-186977
[51] Int. Cl.⁴ ............................................. G06F 7/00
[52] U.S. Cl. .................................. 364/715.08; 364/900
[58] Field of Search .................. 364/715, 900, 715.08, 364/715.04

[56] References Cited

U.S. PATENT DOCUMENTS

| | | | |
|---|---|---|---|
| 3,961,750 | 6/1976 | Dao .................................. | 364/715 X |
| 4,345,316 | 8/1982 | Hirotani et al. ....................... | 364/900 |
| 4,383,304 | 5/1983 | Hirashima ............................. | 364/715 |
| 4,396,994 | 8/1983 | Kang et al. ........................... | 364/900 |
| 4,472,788 | 9/1984 | Yamazaki ............................. | 364/900 |
| 4,509,144 | 4/1985 | Palmer et al. ......................... | 364/900 |
| 4,583,197 | 4/1986 | Chappell et al. ....................... | 364/900 |
| 4,653,019 | 3/1987 | Hodge et al. .......................... | 364/900 |

Primary Examiner—Gary V. Harkcom
Assistant Examiner—Tan V. Mai
Attorney, Agent, or Firm—Foley & Lardner, Schwartz, Jeffery, Schwaab, Mack, Blumenthal & Evans

[57] ABSTRACT

In a barrel shifter, carry-including rotation operation is implemented only by hardware in such a way that: an N-bit data is shifted by a given shift count through selectors in response to shift signals to obtain a 2N-bit shifted data; a carry is inserted behind a least significant bit of the shifted data through AND gates responsive to a carry signal and a carry rotate signal; and logical sums of each of N lower significant bits of the sN-bit shifted data and each of (shifted by one bit in the higher significant direction) (N-1) higher significant bits thereof are found through selectors and OR gates in response to a carry rotate signal to obtain an N-bit rotated data with carry.

6 Claims, 8 Drawing Sheets

3-BIT LEFT SHIFT

SHIFT SECTION S

5-BIT LEFT ROTATE

5-BIT LEFT CARRY ROTATE

3-BIT LEFT CARRY ROTATE

3-BIT RIGHT CARRY ROTATE

BARREL SHIFTER FOR ROTATING DATA WITH OR WITHOUT CARRY

BACKGROUND OF THE INVENTION

1. Field of the Invention

The present invention relates to a barrel shifter, and more specifically to a barrel shifter which can effect a carry-including data rotating operation at a high speed on the basis of a relatively simple hardware configuration without depending upon software.

2. Description of the Prior Art

In a register such as accumulator, data are circulated in a bit unit including a carry bit. To effect the carry-including data relating operation, a series of flip-flop circuits have been employed. However, in this flip-flop configuration, since only a single bit is shifted in response to a clock signal, in order to shift or rotate a data with a carry by N bits, it is necessary to supply N clock signals to the flip-flop circuit. Therefore, when a data of many bits is to be rotated together with a carry, it takes a long time (N cycles).

Further, the carry-including data rotating operation can be effected by use of a barrel shifter. In this case, after a data has been shifted by a predetermined shift count, a carry bit is inserted into any given position in accordance with a microprogram. Therefore, there still exists a problem in that it takes a long time to execute the microprogram.

The operation of the prior-art flip-flop circuit or the barrel shifter will be described in further detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a barrel shifter which can effect a carry-including data rotating operation at a high speed without complicating the circuit configuration. The carry-including data rotating operation of the barrel shifter according to the present invention can be achieved by hardware within the same operation time as the carry-excluding data rotating operation of the conventional barrel shifter.

To achieve the above-mentioned object, a barrel shifter according to the present inventin comprises (a) shifting means for selectively shifting an N-bit input data by a given shift count in response to a plurality of shift signals indicative of a shift count in combination and outputting 2N-bit output data; (b) ANDing means connected to said shifting means for ANDing a carry signal and a carry rotate signal CR to insert a carry bit Ca behind a least significant bit position of the shifted N-bit output in cooperation with the shift signals; and (c) ORing means connected to said shifting means for finding logical sums of each of N lower significant bits and each of N higher significant bits in response to a rotate signal R to obtain an N-bit rotated data without carry, and logical sums of each of N lower significant bits and each of (N-1) high significant bits in response to a carry rotate signal CR to obtain an N-bit rotated data with carry.

It is the object of the present invention to provide a method of rotating an N-bit data with carry at high speed by the use of only hardware.

To achieve the above-mentioned object, the method of rotating an N-bit data with carry according to the present invention comprises the following steps of:

(a) shifting a data by a given shift count in response to shift signals to obtain a 2N-bit shifted data; (b) inserting a carry bit behind a least significant bit of the shifted data in response to a carry signal and a carry rotate signal; (c) finding logical sums of each of N lower significant bits of the 2N-bit shifted data and each of (N-1) higher significant bits of the 2N-bit shifted data in response to a carry rotate signal; and (d) storing a bit before a most significant bit of the carry rotated data in a carry flip-flop.

In the barrel shifter according to the present invention, an N-bit data is shifted by a given shift count in response to shift signals to obtain a 2N-bit shifted data; a carry is inserted behind the least significant bit of the shifted data through AND gates in response to a carry signal and a carry rotate signal; when the N-bit data is rotated without carry, logical sums of each of N lower significant bits of the 2N-bit shifted data and each of N higher significant bits of the 2N-bit shifted data are found in response to a rotate signal; and when the N-bit data is rotated with carry, logical sums of each of N lower significant bits of the 2N-bit shifted data and each of (N-1) higher significant bits (shifted by a bit in the higher significant direction) thereof are found in response to a carry rotate signal. Therefore, it is possible to implement a carry-including rotation operation at high speed in spite of a relatively simple circuit configuration.

BRIEF DESCRIPTION OF THE DRAWINGS

The features and advantages of the barrel shifter according to the present invention over the prior-art barrel shifter will be more clearly appreciated from the following description of the preferred embodiment of the invention taken in conjunction with the accompanying drawings in which.

DETAILED DESCRIPTION OF THE PREFERRED EMBODIMENTS

To facilitate understanding of the present invention, a brief reference will be made to prior-art shifters, with reference to the attached drawings.

Figure 1:
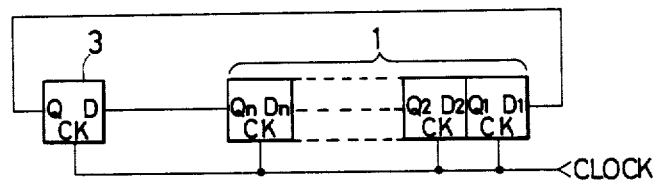
FIG. 1 is a schematic block diagram showing a prior-art flip-flop circuit for implementing a data rotating operation.

FIG. 1 shows a flip-flop circuit for effecting a carry-including data rotation, in which N-piece flip-flop circuits 1 are connected in series and additionally a flip-flop circuit 3 for a carry inserting operation is connected to the most significant bit side of the N flip-flops 1.

In this flip-flop shifter shown in FIG. 1, each bit stored in each of the series-connected N flip-flops 1 is shifted bit by bit in the higher order direction (in the leftward direction) when a clock signal is applied to the flip-flop circuit 1. Further, a bit stored in the carry flip-flop 3 is shifted to the least significant bit flip-flop side in response to the clock signal.

In the above operation, where a data stored in the flip-flop circuit 1 is rotated together with a carry toward the most significant bit direction (the leftward direction), this data shift operation is referred to as a left carry rotation; and where a data stored in the flip-flop circuit 1 is rotated together with a carry in the least significant bit direction (the rightward direction), this data shift operation is referred to as a right carry rotation.

In the prior-art flip-flop shifter, since a data is shifted bit by bit in response to a signal clock signal, N clock signals should be supplied to the flip-flop circuit 3 for implementing an N-bit carry rotation, so that it takes a time corresponding to N cycles. Therefore, when a many-bit data is carry rotated, there exists a problem in that the carry rotation operation requires a long shifting time.

Figure 2:
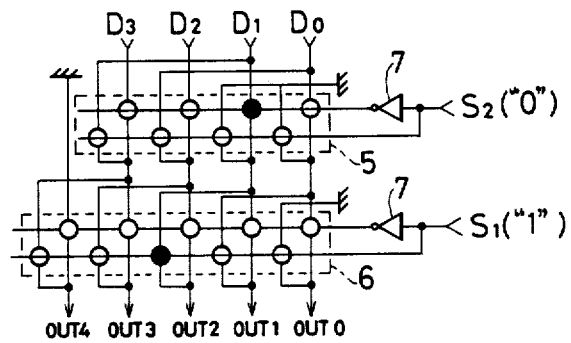
FIG. 2 is a schematic block diagram showing a prior-art barrel shifter for implementing a data rotating operation.

FIG. 2 shows a prior-art barrel shifter for implementing a carry rotation operation, in which after a data has been shifted by a predetermined shift count, a carry is inserted into a predetermined position in accordance with a microprogram. In FIG. 2, an input data D0 to D3 can be shifted by 0 to 3 bits in the leftward direction through two selectors 5 and 6 each of whose conduction is controlled in response to two shift signals S2 and S1. When the shift signal S2 or S1 is applied via an inverter 7 to a selector 5 or 6, the selector 5 or 6 is turned on into a conductive state to output an input data from the output terminal OUT. For instance, if S2 is at "0" and S1 is at "1", D1 is shifted by two bits in the leftward direction and outputted from OUT 2 through two selector elements as shown in black in FIG. 2.

Figure 3:
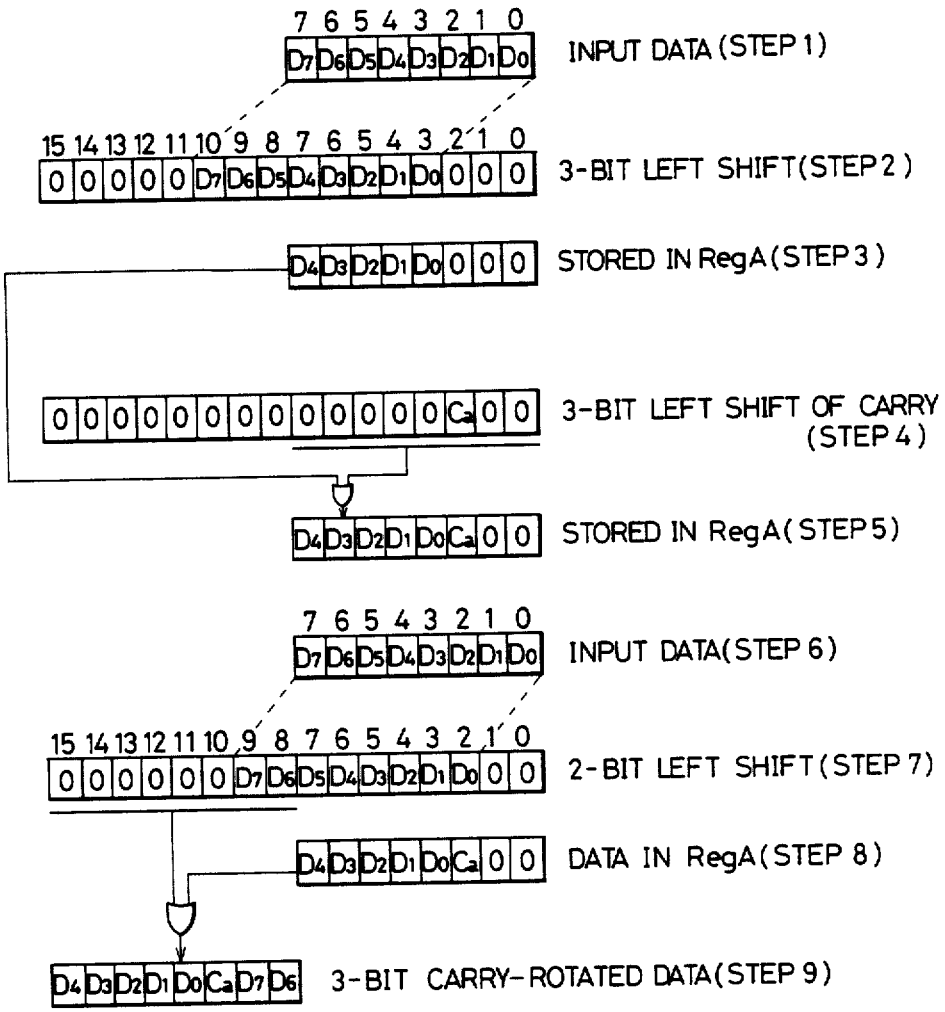
FIG. 3 is a series of diagrams for assistance in explaining the operation of carry-including data rotating operation in the prior-art barrel shifter shown in FIG. 2.

The carry-including rotation operation of the barrel shifter shown in FIG. 2 will be described with reference to FIG. 3. For instance, where an 8-bit input data D0 to D7 is rotated together with a carry Ca by 3 bits in the leftward direction (3-bit left carry rotation), an input data D0 to D7 (step 1) are all shifted by 3 bits in the leftward direction (step 2), and "0" is set to the remaining register areas as shift-in information.

In the usual situation, when an input data is N (8) bits, the output of the barrel shifter is 2N (16) bits. Therefore, when an 8-bit input data of D0 to D7 is shifted by 3 bits in the leftward direction, the output of the barrel shifter is divided into two, 8 higher order bits of "0 0 0 0 0 D7, D6, D5" and 8 lower order bits of "D4, D3, D2, D1 0 0 0". These 8 lower order bits are stored in a register A (in step 3).

Subsequently, all the input data are set to "0" and then a carry Ca is set as the shift-in information. The carry Ca is shifted by three bits in the leftward direction to set the carry Ca in the second bit output OUT 2 of the barrel shifter (in step 4). Logical sums of the 8 lower order bits stored in the register A and the output of the barrel shifter are found, and the found result of "D4, D3, D2, D1, D0, Ca, 0 0" is stored again in the register A (in step 5).

Subsequently, the input data D0 to D7 stored (in step 6) is shifted by two bits in the leftward direction (in step 7). Thereafter, logical sums of the 8 higher order bits as shifted above and the bits of "D4, D3, D2, D1, D0, Ca, 0, 0" stored in the register A are found to implement a 3-bit left carry rotation of an input data of D0 to D7 (in step 9), so that a 3-bit carry rotated data of D4, D3, D2, D1, D0, Ca, D7, D6 can be obtained.

In the above-mentioned carry rotation of an input data through a barrel shifter, it is necessary to execute a processing of inserting a carry Ca into a given bit position in accordance with a program, thus there exists a problem in that a relatively long execution time is needed.

Figure 4:
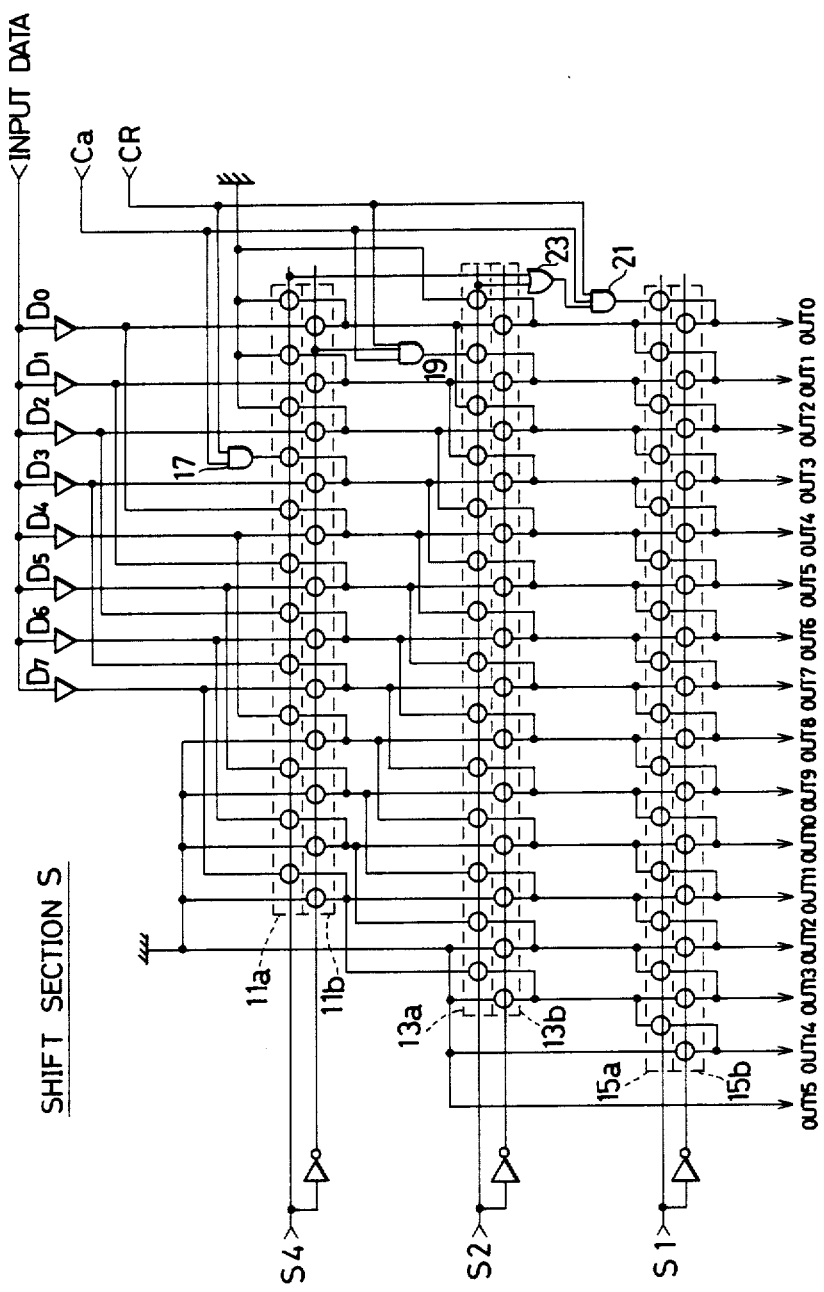
FIG. 4 is a schematic block diagram showing a shift section of an embodiment of the barrel shifter according to the present invention.

In view of the above description, reference is now made to an embodiment of the barrel shifter according to the present invention. FIG. 4 shows a block diagram of a shift section S of the barrel shifter according to the present invention. In this embodiment, an 8 bit input information data can be rotated with or without carry; that is, the shift section S can shift an 8-bit input data by 0 to 7 bits in the leftward direction and insert a carry Ca behind the least significant bit of the shifted N-bit data.

The shift section S comprises six selectors 11a, 11b, 13a, 13b, 15a and 15b for shifting an input data D0 to D7 by a given shift count and outputting a shifted data through 16 output terminals OUT 0 to OUT 15, and three AND gates 17, 19 and 21 for setting a carry Ca behind the least significant bit of the input data D0 to D7. The selectors 11a and 11b are controlled in response to a shift signal S4; the selectors 13a and 13b are controlled in response to a shift signal S2; and the selectors 15a and 15b are controlled in response to a shift signal S1. Each of these selectors 11a to 15b is turned on into a conductive state in response to a "1" level shift signal, but turned off into a non-conductive state in response to a "0" level shift signal. Each (one circle in FIG. 4) of these selectors is a MOS transistor, for instance.

When the selectors 11b, 13b and 15b are turned on simultaneously in response to "0" level shift signals, an input data D0 to D7 is outputted through the output terminals OUT 0 to OUT 7 without shift operation. If the selector 11a is turned on, all input data D0 to D7 are shifted by 4 bits in the leftward direction; if the selector 13a is turned on, all the data inputted to this selector 13a are shifted by two bits in the leftward direction; if the selector 15a is turned on, all the data inputted to this selector 15a are shifted by one bit in the leftward direction, as is well understood in FIG. 4. Shifted data are outputted through the output terminals OUT 0 to OUT 15.

In summary, the shift signals S4, S2 and S1 indicate shift counts of input data D0 to D7 in combination. If S4=S2=S1="0", the shift count is 0 bit; if S4=S2="0" and S1="1", the shift count is 1 bit; ... if S4=S2=S1="1", the shift count is 7 bit. Therefore, on the basis of a combination of three shift signals S4, S2, and S1, input data D0 to D7 are shifted by 0 to 7 bits through the selectors 11a to 15b, respectively, in the leftward direction and outputted through the output terminals OUT 0 to OUT 14.

The AND gates 17, 19 and 21 serve to insert a carry Ca behind the shifted input data D0 to D7 in order to implement a carry rotate operation. In the case of left carry rotate rotation of input data D0 to D7, since the input data D0 to D7 are rotated on the basis of a carry Ca, the carry Ca is inserted between the most significant bit and the least significant bit of the non-rotated input data D0 to D7.

For instance, in the case of a 5-bit left carry rotate operation of an input data of "D7 D6 D5 D4 D3 D2 D1 D0" (the most significant bit is D7 and the least significant bit is D0), the carry rotated result is "D2 D1 D0 Ca D7 D6 D5 D4", that is, the carry Ca is inserted between the least significant bit D0 and the most significant bit D7.

To the AND gate 17, a carry signal Ca from a carry flip-flop (not shown) and a carry rotate signal CR are applied. If the carry rotate signal CR is at "0" level, the barrel shifter implements a carry-excluding rotate operation; if CR is at "1" level, the barrel shifter implements a carry-including rotate operation.

This AND gate 17 supplies a carry signal Ca to the shifter section, when the shift signal S4 is at "1" level, irrespective of the level of the shift signals S1 and S2. That is, when the shift signal S4 is at "1" level, since the least significant bit D0 is shifted at least 4 bits in the leftward direction, the carry signal Ca supplied through the AND gate 17 is outputted through any one of the output terminals OUT 3 to OUT 6 according to the level of the shift signals S2 and S1.

An inverted shift signal S4 is given to the AND circuit 19, in addition to the carry signal Ca and the carry-including rotate signal CR. This AND gate 19 supplies a carry signal Ca to the shifter section S, when the shift signal S4 is at "0" level and the shift signal S2 is at "1" level, irrespective of the level of the shift signal S1. Therefore, when the shift signal S4 is at "0" level and the shift signal S2 is at "1" level, respectively, since the input data is shifted by 2 or 3 bits inthe leftward direction, the carry signal Ca supplied through the AND gate 19 is outputted through either one of the output terminals OUT 1 or OUT 2 according to the level of the shift signal S1.

An output of a NOR gate 23 (to which the shift signals S4 and S2 are inputted) is given to the AND gate 21, in addition to the carry signal Ca and the carry-including rotate signal CR. This AND gate 21 applies a carry signal Ca to the shifter section S, when the shift signals S4 and S2 are at "0" level and the shift signal S1 is at "1" level. Therefore, when the shift signals S4 and S2 are at "0" level and the shift S1 is at "1" level, since the input data D0 is shifted by one bit in the leftward direction and then outputted through the output terminal OUT 1, the carry signal Ca supplied via the AND gate 21 is outputted through the output terminal OUT 0.

Further, in the above shift operation and the carry insert operation of the input data D0 to D7, "0" is set to the output terminals through which no input data D0 to D7 and no carry Ca are outputted.

Figure 5:
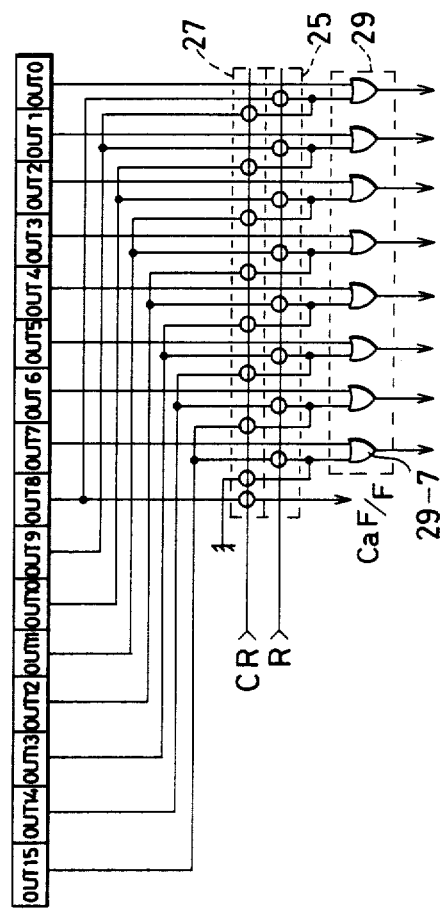
FIG. 5 is a schematic block diagram showing a rotate section of an embodiment of the barrel shifter according to the present invention.

FIG. 5 shows a block diagram of a rotate section R of the barrel shifter according to the present invention. The rotate section R comprises two selectors 27 and 25 and eight OR gates 29, by which the input data D0 to D7 shifted by the shifter section S of the barrel shifter shown in FIG. 4 can be rotated simply when no carry Ca is inserted, and rotated together with a carry Ca when a carry Ca is inserted. In the case of a carry-excluding rotate operation of an 8-bit input data D0 to D7, the input data D0 to D7 is shifted and "0" is set into the remaining areas, and therafter the input data D0 to D7 can be rotated by finding logical sums of each bit of output terminals OUT 0 to OUT 7 and each bit of output terminals OUT 8 to OUT 15, respectively (e.g. OUT 0 and OUT 8, OUT 1 and OUT 9, . . . ).

In the case of a carry rotation operation of the 8-bit input data D0 to D7, since a carry Ca is inserted behind the least significant bit D0 of the shifted input data D0 to D7, the input data D0 to D7 are carry-rotated by finding logical sums of each bit of the output terminals OUT 0 to OUT 7 and each bit of the output terminals OUT 9 to OUT 15, respectively (e.g. OUT 0 and OUT 9, OUT 1 and OUT 10 . . . ).

The selectors 25 and 27 have the similar function of the selectors 11a to 15b shown in FIG. 4. The selector 25 is turned on into a conductive state in response to a rotate signal R, to supply each bit of the input data outputted from the higher order output terminals OUT 8 to OUT 15 of the shifter section S to each of one input terminals of the OR gates 29.

The selector 27 is turned on into a conductive state in response to a carry-including rotate signal CR, to supply an input data (outputted from the output terminal OUT 8 to a carry flip-flop Ca F/F) and each of the input data outputted from the higher order output terminals OUT 9 to OUT 15 of the shifter section S to each of one input terminals of the OR gates 29. On the other hand, each bit of the input data outputted from the lower order output terminals OUT 0 to OUT 7 of the shifter section S is supplied to each of the other input terminals of the OR gates 29.

Therefore, in the case of carry-excluding (R) rotation operation, since the selector 25 is turned on, the 8 OR gates 29 find logical sums of OUT 0 and OUT 8, OUT 1 and OUT 9, OUT 2 and OUT 10, OUT 3 and OUT 11, OUT 4 and OUT 12, OUT 5 and OUT 13, OUT 6 and OUT 14, and OUT 7 and OUT 15, in combination, so that it is possible to obtain a rotated input data D0 to D7 through the outputs of the OR gates 29.

Further, in the case of the carry-including (CR) operation, since the selector 27 is turned on, the 8 OR gates 29 find logical sums of OUT 0 and OUT 9, OUT 1 and OUT 10, OUT 2 and OUT 11, OUT 3 and OUT 12, OUT 4 and OUT 13, OUT 5 and OUT 14, and OUT 6 and OUT 15, in combination. Further, since a "0" level signal is applied to one input terminal of the OR gate 29-7 (having the other input terminal connected to the OUT 7), this OR gate 29-7 outputs a bit of the terminal OUT 7 as it is, so that it is possible to obtain a carry-rotated input data D0 to D7 through the outputs of the OR gates 29.

In summary, it is possible to implement the carry-excluding rotation operation and the carry-including rotation operation of the input data D0 to D7 by finding the logical sums of data outputted from the lower order output terminals OUT 0 to OUT 7 and that outputted from the higher order output terminals OUT 8 or 9 to OUT 15.

The operation of the barrel shifter configured as described above will be described hereinbelow in detail with reference to FIGS. 6 to 9.

Figure 6:
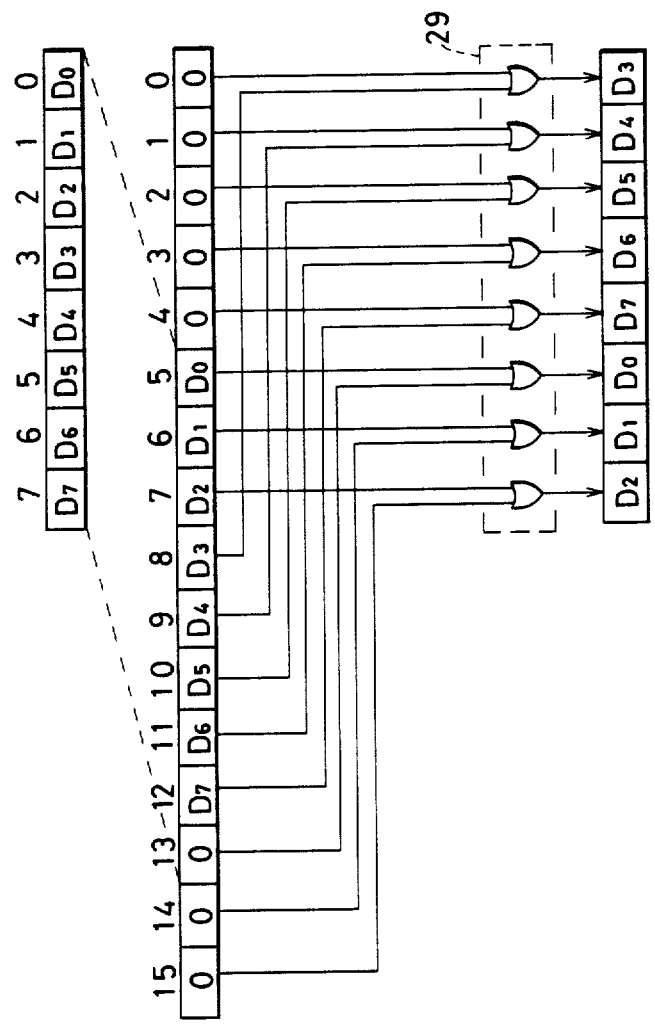
FIG. 6 is a diagram for assistance in explaining a carry-excluding 5-bit left data rotating operation in the barrel shifter shown in FIGS. 4 and 5.

(A) 5-bit left carry-excluding rotate operation (FIG. 6)

(1) Shift section S:

When an input data D0 to D7 is rotated in the leftward direction and the rotate count is 5 bits, since the shift count is also 5 bits, S4="1"; S2="0", and S1="1". Therefore, the selectors 11a, 13b and 15a are conductive and the selectors 11b, 13a and 15b are nonconductive.

Since the selector 11a is conductive, the input data D0 to D7 are shifted 4 bits in the leftward direction. Further, since the selector 15a is conductive, the data inputted to this selector 15a is shifted 1 bit in the same direction. As a result, the input data D0 to D7 is outputted from the output terminals OUT 5 to OUT 12, and "0" level signals are outputted from the remaining output terminals OUT 0 to OUT 4 and OUT 13 to OUT 15; that is, the input data D0 to D7 is shifted 5 bits in the leftward direction.

(2) Rotate section R:

The rotate signal R is "1" level, so that the selector 25 is conductive. Therefore, bits of the lower order output terminals OUT 0 to OUT 7 are directly applied to the OR gates 29, and bits of the higher order output terminals OUT 8 to OUT 15 are applied via the selector 25 to the OR gate 29, as shown in FIG. 6, to find logical sums of each bit of the data outputted from the lower order output terminals OUT 0 to OUT 7 and each bit of the data outputted from the higher order output terminals OUT 8 to OUT 15. The output data of the OR gates 29 is "D2 D1 D0 D7 D6 D5 D4 D3". This data is the same obtained by rotating the input data D0 to D7 by 5 bits in the leftward direction. The above 5-bit left rotation operation is thus completed.

Figure 7:
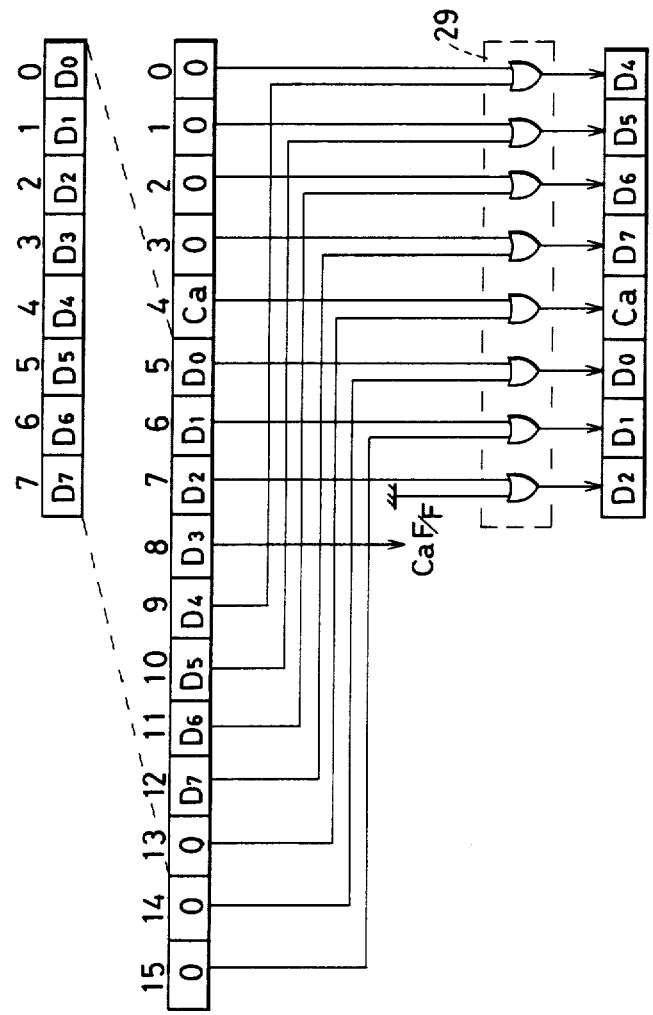
FIG. 7 is a diagram for assistance in explaining a carry-including 5-bit left data rotating operation in the barrel shifter shown in FIGS. 4 and 5.

(B) 5-bit left carry-including rotate operation (FIG. 7)

(1) Shift section S:

When on input data D0 to D7 is carry-rotated in the leftward direction and the rotate count is 5 bits, since the shift count is 5 bits, the shift count is also 5 bits, in the same way as in the carry-excluding rotation operation, the input data D0 to D7 is outputted from the output terminals OUT 5 to OUT 12, and "0" level signals are outputted from the remaining output terminals OUT 0 to OUT 3 and OUT 13 to OUT 15; that is, the input data D0 to D7 is shifted by 5 bits in the leftward direction.

In addition, since the carry rotate signal Cr is at "1" level and the shift count of the input data D0 to D7 is 5 bits (i.e. S4="1", S2="0"; and S1="1"), the selectors 11a, 13b and 15a are conductive and further a carry signal Ca is applied via the AND gate 17 to the output 4, so that the carry Ca is inserted behind the bit D0, as shown in FIG. 7.

(2) Rotate section R:

The carry rotate signal RS is "1" level, so that the selector 27 is conductive. Therefore, bits of the lower order output terminals OUT 0 to OUT 7 are directly applied to the OR gate 29 and bits of the higher order output terminals OUT 9 to OUT 15 are applied via the selector 27 to the OR gate 29, as shown in FIG. 7, to find logical sum of each of the bits outputted from the lower order output terminals OUT 0 to OUT 7 and each of the bits outputted from the higher order output terminals OUT 9 to OUT 15. Further, a logical sum of the bit D2 outputted from the output terminal OUT 7 and "0" (ground) level is found by the OR gate 29. The output data of the OR gates 29 is "D2 D1 D0 Ca D7 D6 D5 D4". This data is the same obtained by rotating the input data D0 to D7 by 5 bits in the leftward direction. However, the bit D3 outputted from the output terminal OUT 8 is stored in a carry flip-flop Ca F/F. The above 5-bit left carry rotation operation is thus completed.

Figure 8:
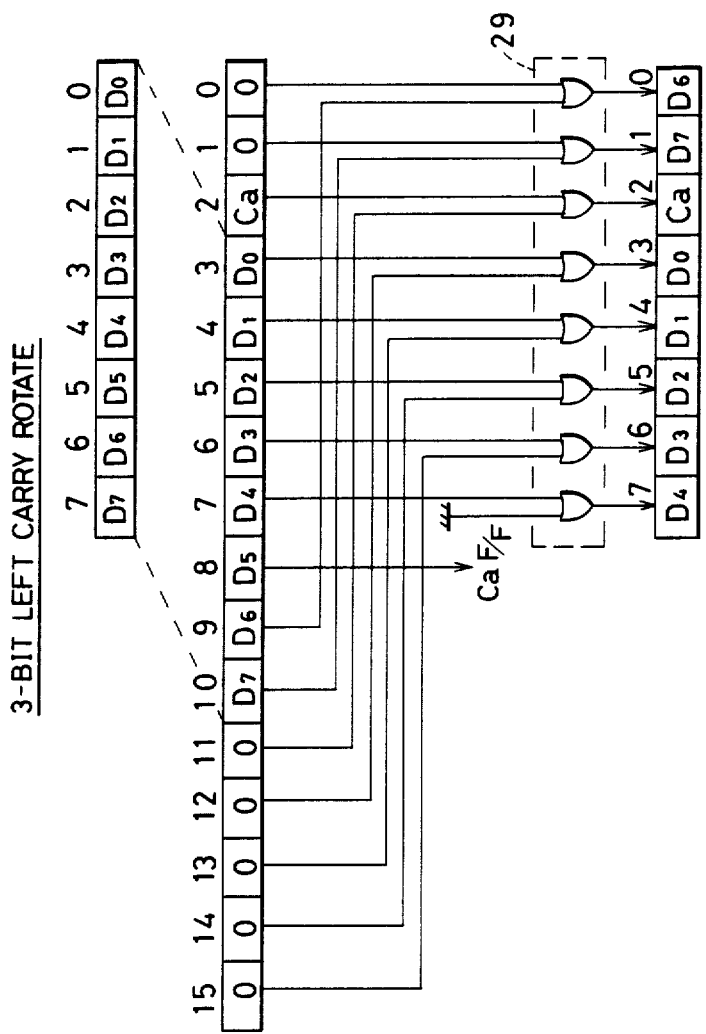
FIG. 8 is a diagram for assistance in explaining a carry-including 3-bit left data rotating operation in the barrel shifter shown in FIGS. 4 and 5.

(C) 3-bit left carry-including rotate operation (FIG. 8)

(1) Shift section S:

An input data D0 to D7 is shifted by 3 bits in the leftward direction and a carry Ca is inserted behind the bit D0.

(2) Rotate section R:

Logical sums of each of the bits outputted from the lower order output terminals OUT 0 to OUT 7 and each of the bits outputted from the higher order output terminals OUT 9 to OUT 15 are obtained. Further, the logical sum of the bit D4 outputted from the output terminal OUT 7 and "0" (ground level is found by the OR gate 29. The output data of the OR gate 29 is "D4 D3 D2 D1 D0 Ca D7 D6".

Figure 9:
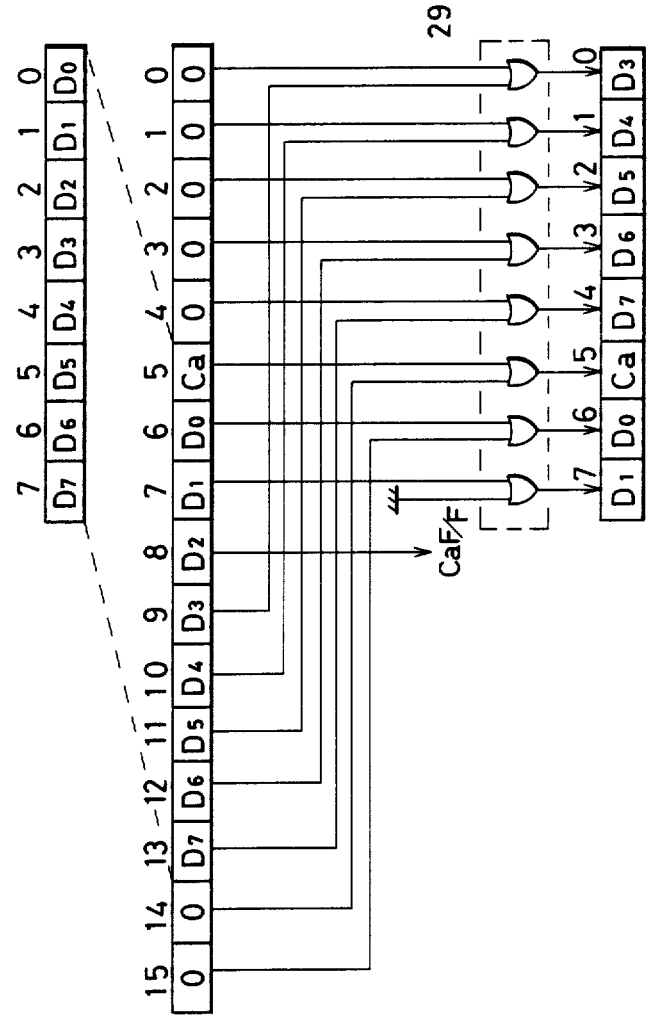
FIG. 9 is a diagram for assistance in explaining a carry-including 3-bit right data shifting operation in the barrel shifter shown in FIGS. 4 and 5.

(D) 3-bit right carry-including rotate operation (FIG. 9)

In addition, the relationship between leftward carry-excluding rotate count L and rightward carry-excluding rotate count R can be expressed as $$L = N - R$$

where N denotes the number of input data bits. Further, the relationship between leftward carry-including rotate count Lc and the rightward carry-including rotate count Rc can be expressed as $$Lc = N - Rc + 1$$

Therefore, in the above examples (A) to (C), the operation of the barrel shifter according to the present invention has been explained only for the leftward rotate operation. However, the rightward rotation operation can be implemented on the basis of the conversion of the leftward rotate operation in accordance with the above expressions.

For instance, when the number of input data bits N is 8 bits, and the right carry-including rotate count Rc is 3 bits, $$Lc = 8 - 3 + 1 = 6$$

Therefore, the above 3-bit right carry-including rotate operation is the same as 6-bit left carry-including rotation operation as shown in FIG. 9.

What is claimed is:

1. A barrel shifter comprising:
   (a) shifting means for selectively shifting an N-bit input data by a given shift count in response to a plurality of shift signals indicative of a shift count in combination and outputting a 2N-bit output data;
   (b) ANDing means connected to said shifting means for ANDing a carry signal and a first carry rotate signal to insert a a carry bit behind a least significant bit position of the shifted N-bit output in cooperation with the shift signals; and
   (c) ORing means connected to said shifting means for finding logical sums of each of N lower significant bits and each of N higher significant bits in response to a rotate signal R to obtain an N-bit rotated data without carry, and logical sums of each of N lower significant bits and each of (N-1) higher significant bits in response to a second carry rotate signal CR to obtain an N-bit rotated data with carry.

2. A barrel shifter for shifting an N-bit data, which comprises:
   (a) a plurality of parallel-connected selectors each having first series-connected selector elements connected to each bit of the N-bit data for shifting the N-bit data in response to one of shift signals and second series-connected selector elements also connected to each bit of the N-bit data for directly outputting the N-bit data without shift in response to one of inverted shift-signals;
   (b) a plurality of ANDing means each connected to one of said first series-connected selector elements for inserting a carry bit behind a least significant bit of the shifted N-bit output in response to an AND product of a carry signal and a first carry rotate signal in cooperation with the shift signals;
   (c) two parallel-connected selectors each having third series-connected selector elements connected to a first plurality of outputs of one of the parallel-connected selectors for outputting (N-1) higher significant bits in response to a second carry rotate signal and fourth series-connected selector elements connected to a second plurality of outputs of the same one of the parallel-connected selectors for outputting N higher significant bits in response to a rotate signal; and
   (d) ORing means connected to said two parallel-connected selectors for outputting an N-bit rotated data without carry by finding logical sums of each of N lower significant bits and each of N higher significant bits outputted from said fourth series-connected selector elements in response to the rotate signal and for outputting an N-bit rotated data including a carry by finding logical sums of each of N lower significant bits and each of (N-1) higher significant bits outputted from said third series-connected selector elements in response to the second carry rotate signal.

3. A method of rotating an N-bit data with carry, which comprises the following steps of:
   (a) shifting a data by a given shift count in response to shift signals to obtain a 2N-bit shifted data;
   (b) inserting a carry bit behind a least significant bit of the shifted data in response to a carry signal and a carry rotate signal;
   (c) finding logical sums of each of N lower significant bits of the 2N-bit shifted data and each of (N-1) higher significant bits of the 2N-bit shifted data in response to another carry rotate signal to obtain an N-bit rotated data with carry bit; and
   (d) storing a bit before a most significant bit of the carry rotated data in a carry flip-flop.

4. The method of claim 3, wherein a relationship between carry-including rotate count Lc and rightward carry-including rotate count Rc is expressed as $$Lc = N - Rc - 1$$

where N denotes the number of input data bits.

5. A method of rotating an N-bit data with or without carry, which comprises the following steps of:
   (a) shifting a data by a given shift count in response to shift signals to obtain a 2N-bit shifted data;
   (b) when the N-bit data is rotated without carry, finding logical sums of each of N lower significant bits of the 2N-bit shifted data and each of N higher significant bits of the 2N-bit shifted data in response to a rotate signal to obtain an N-bit rotated data without carry;
   (c) when the N-bit data is rotated with carry, inserting a carry behind a least significant bit of the shifted data in response to a carry signal and a carry rotate signal;
   (d) finding logical sums of each of N lower significant bits of the 2N-bit shifted data and each of (N-1) higher significant bits of the 2N-bit shifted data in response to another carry rotate signal to obtain an N-bit rotated data with carry; and
   (e) storing a bit before a most significant bit of the rotated data with carry in a carry flip-flop.

6. The method of claim 5, wherein a relationship between leftward carry-excluding rotate count L and rightward carry-excluding rotate count R is expressed as $$L = N - R$$

where N denotes the number of input data bits.